United States Patent [19]

Tiemann

[11] 4,212,338
[45] Jul. 15, 1980

[54] VEHICLE WHEEL WITH ANNULAR EMERGENCY SUPPORT

[75] Inventor: Reinhard Tiemann, Hemmingen, Fed. Rep. of Germany

[73] Assignee: Continental Gummi-Werke Aktiengesellschaft, Hanover, Fed. Rep. of Germany

[21] Appl. No.: 908,269

[22] Filed: May 22, 1978

[30] Foreign Application Priority Data

May 20, 1977 [DE] Fed. Rep. of Germany ....... 2722885

[51] Int. Cl.² .............................................. B60C 17/04
[52] U.S. Cl. ............................... 152/158; 152/330 RE
[58] Field of Search .................. 152/330 RF, 152, 158

[56] References Cited

U.S. PATENT DOCUMENTS

| 3,949,796 | 4/1976 | Bartos | 152/158 |
| 3,981,341 | 9/1976 | Baver et al. | 152/158 |
| 4,121,640 | 10/1978 | Henning et al. | 152/158 |

*Primary Examiner*—Richard A. Bertsch
*Attorney, Agent, or Firm*—Becker & Becker, Inc.

[57] ABSTRACT

A vehicle wheel having an annular emergency support arranged within the hollow space of a pneumatic tire mounted on the wheel. The annular support is supported on the rim of the wheel between the two beads of the tire and next to the drop center of the rim by means of a projection located on the inner periphery of the annular support. The projection extends radially inwardly and may be introduced into the drop center to facilitate mounting and removal of the annular support.

5 Claims, 1 Drawing Figure

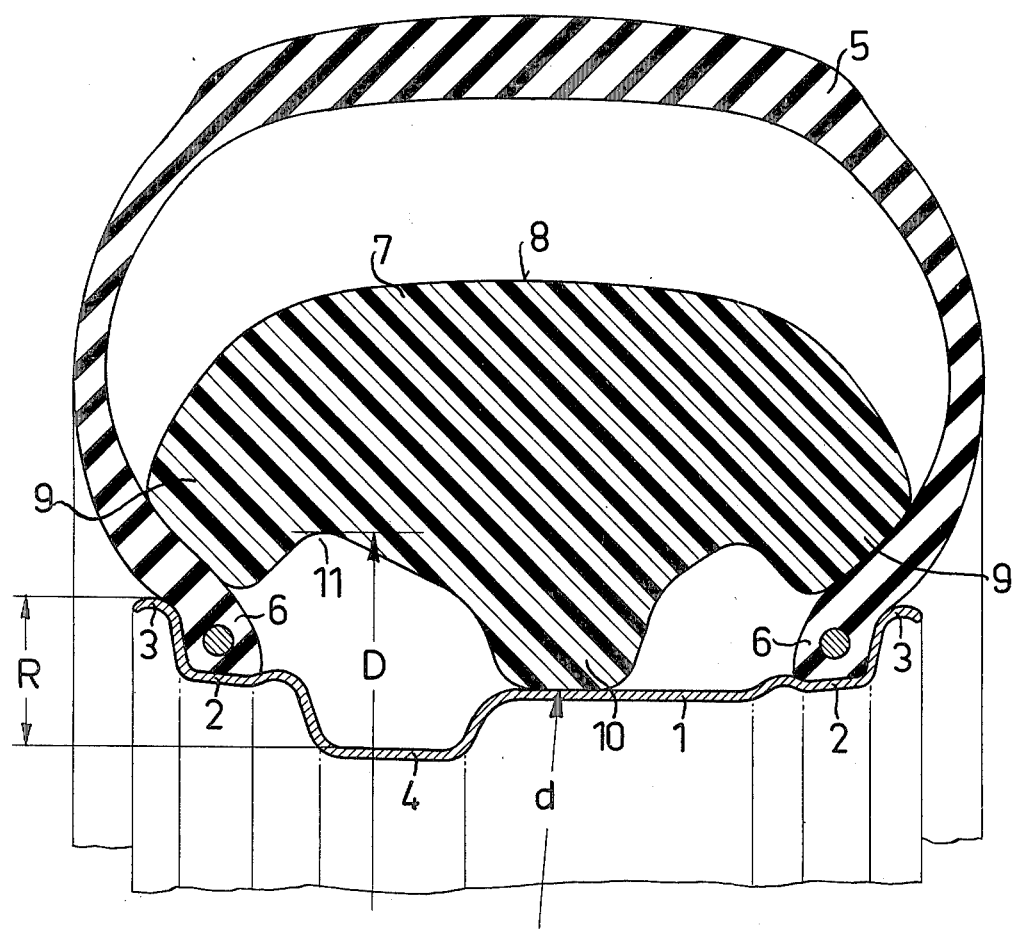

VEHICLE WHEEL WITH ANNULAR EMERGENCY SUPPORT

The present invention relates to a vehicle wheel having an annular emergency support arranged within the hollow space of a tire mounted on the wheel. The annular support is supported on the rim between the two beads of the pneumatic tire.

It is an object of the present invention to develop a vehicle wheel which, with a one-piece rim, makes possible a simplified mounting of the annular emergency support which is supported on the rim.

This object and other objects and advantages of the present invention will appear more clearly from the following specification in connection with the accompanying drawing, which shows a radial partial section through a wheel for a passenger car with an annular emergency support and tire mounted on the wheel.

The vehicle wheel and annular emergency support of the present invention are characterized primarily in that the annular emergency support is supported on the rim next to the drop center of the rim by means of a projection located on the inner periphery of the annular emergency support. The projection may be introduced into the drop center to facilitate mounting and removal of the annular support.

An annular emergency support pursuant to the present invention makes possible a good centering and, in addition, a sufficiently large supporting capacity of the annular emergency support in the event of damage to the tire. At the same time, mounting the annular emergency support is made possible by the fact that the projection of the annular emergency support, which projection is supported on the rim during normal operation, can be introduced into the drop center during mounting, in order, with one-piece rims, to thus be able to pull the annular emergency support over the pertaining rim flange.

On both sides of this projection, the annular emergency support is provided with sections with which it can rest on the interior surface of the tire on the tire beads or just above the tire beads.

It is to be understood that a suitable, at least slightly deformable body must be used for the annular emergency support. Such a body may comprise cellular or porous rubber or rubber-like synthetic material. Such a material has a sufficient strength, and moreover makes possible the deformation required for mounting.

Referring now to the drawing in detail, the rim 1 has an eccentrically located drop center or well 4 between the tire seats 2 and their adjacent rim flanges 3. The drop center 4 forms a groove-like recess which extends over at least a large portion of the periphery of the rim. In general, the drop center 4 simplifies mounting of the pneumatic tire 5 having beads 6, since during mounting or removal one bead 6 is introduced into the drop center 4.

The annular emergency support 7, which comprises light polyurethane and is provided with a support surface 8 on its outer periphery, has a nearly curved cross section with bends 9 arranged on both sides and an annular, approximately trapezoidal projection 10 located between the bends 9. During normal operation, the inner periphery of the projection 10 rests approximately on the middle of the rim. Thus, the projection 10 is arranged adjacent to the eccentrically located drop center 4. The cross section of the projection 10 is such that the projection 10 can be introduced into the drop center 4 with a certain amount of play, in order in this way, during mounting of the tire, with the smaller inner diameter of the projection 10, to be able to overcome the larger diameter rim flange 3. In order to simplify this manipulation still further, annular recesses 11 are located on both sides of the projection 10. The diameter D of the recesses 11 is larger than the diameter d of the projection 10 by about two times the radial distance R between the base of the drop center 4 and the radially outwardly lying section of the rim flange 3. In this way, during mounting or removal, the projection 10 can enter the drop center 4 without fearing hindrance from the rim flange 3.

The bends 9 rest flat on the inner side of the tire nearly above the rim flanges 3. This guarantees that support can take place on the surface 8 in the case of tire damage. Moreover, the beads 6 cannot slide off their seats 2.

The present invention is, of course, in no way limited to the specific showing in the drawing, but also encompasses any modifications within the scope of the appended claims.

What I claim is:

1. In combination: a vehicle wheel which has a rim with rim flanges and a drop center; a pneumatic tire having two bead sections and being mounted on said wheel; and an annular emergency support arranged within the hollow space of said tire, said annular support being provided with projection means located on and extending radially inwardly from the inner periphery of said annular support between said bead sections for supporting said annular support on said rim of said wheel between said bead sections adjacent to said drop center, said projection means being introduceable into said drop center for facilitating mounting and removal of said annular support, said annular support having provided on its inner periphery, on at least one side of said projection means, recess means for simplifying mounting and removal of said annular support from said wheel, the inner diameter of said recess means being greater than the inner diameter of said projection means, the difference between said diameters being at least about twice as great as the radial distance from the base of said drop center to the radially outer extremity of said wheel flanges.

2. The combination according to claim 1, in which said annular support is angled off on both sides of said projection means toward said tire bead sections and rests against the inner surface of said tire.

3. The combination according to claim 2, in which said angled off sections of said annular support rest against the inner surface of said tire in the region of said rim flanges.

4. The combination according to claim 1, in which said annular support has an essentially curved cross section, said projection means being located in about the middle of the inner periphery of said annular support.

5. The combination according to claim 4, in which said projection means is annular.

* * * * *